United States Patent Office 2,944,026
Patented July 5, 1960

2,944,026
ELECTROLYTES

Preston Robinson, Williamstown, Mass., assignor to Sprague Electric Company, North Adams, Mass., a corporation of Massachusetts No Drawing. Filed May 14, 1957, Ser. No. 658,929

1 Claim. (Cl. 252—62.2)

This invention relates to a series of novel electrolytes which are utilizable in non-aqueous media. The electrolytes comprise unique adducts made up of equimolecular portions of (1) compounds having a strong electron affinity and (2) nucleophilic substances. This application is a continuation-in-part of my copending now abandoned U.S. application Serial No. 403,051, filed January 8, 1954. It is an object of this invention to provide these novel electrolytes to replace those conventionally used heretofore, the new electrolytes being preferable in that they overcome certain inherent disadvantages of the electrolytes used in prior art. Another object of this invention is to provide electrolytes which are relatively noncorrosive and less temperature responsive than those of the prior art.

Additional objects will become apparent from the following description and claim.

As noted above, the electrolyte system of this invention includes equimolecular mixtures of strong electron affinity compounds and nucleophilic substances. Examples of the former include nitro compounds, phenyl amides, phthalic anhydrides, maleic anhydride, and sulphur dioxide; while examples of the latter group include amines, arsines, phosphines and hydrazines. Among the non-aqueous solvents which may be used in the electrolytes of this invention are liquid polyalcohols, amides, nitriles and alkyl phosphates.

It is evident from the above examples that the nucleophilic substances may be further defined as those having at least one pair of unshared electrons.

According to the broad concept of this invention, mixtures of adducts may be used as a single electrolyte system; and solvent combinations may also be used to extend the operational range of the capacitors. Following is a tabulation of specific adduct combinations which are included among the adducts of the invention:

| Compounds of Strong Electron Affinity | Nucleophilic Compounds |
|---|---|
| Nitro Compounds: Nitrated sulphonic acids. | Amines: Triethanolamine. Monoethanolamine. Dimethylaniline. Aniline. Benzidine. Diphenylamine. |
| Phthalic Anhydride. Maleic Anhydride. Sulfur Dioxide. | Arsines: Dibutyl arsine. Phosphines: Triethyl phosphine. |
| Heptafluorobutyric Acid. | Hydrazines: Phenyl hydrazine. |

As stated above, water cannot be used as a solvent with the adducts of the invention. However, any non-ionized organic solvents are operable, the polyalcohols, amides and nitriles being preferred because they are operable within a wide temperature range. Dimethylformamide, propionitrile, triethylene glycol lactonitrile are instances of such solvents. The ratio of adduct to solvent is not critical and the amount of adduct may vary from about 1 to 50% or more of the solvent. Manifestly, an increase in the amount of solute will lead to an increase in conductivity of the system, so that the solute-solvent ratio may be varied by the operator until the desired conductivity is obtained. Although applicants do not wish to be bound by a theory, it is believed that a current-conducting molecular adduct complex is formed.

Following are examples of specific embodiments of the invention. It is to be understood, however, that these embodiments are presented as illustrative only and are not intended to indicate the limits of the invention.

A. An electrolyte capacitor is prepared utilizing an aluminum anode formed from a 3 mil thick, 2¼ inch width etched aluminum foil, formed to 650 v. in boric acid solution, having an area of 20 square inches, and using an unformed unetched 3 mil aluminum cathode foil having approximately the same area; these two electrodes were separated from one another by a fiber glass spacer so as to be positioned about 5 mils apart though this last dimension is neither critical nor exact. The capacitor structure is vacuum impregnated at a temperature of 50° C. with an electrolyte of 9.8 g. maleic anhydride, 9.3 g. aniline and 50 g. glycolo nitrile.

B. The capacitor structure of (A) is vacuum impregnated at 25° C. with an electrolyte consisting of 2.1 g. heptafluorobutyric acid, 1.5 g. triethanol amine and 50 g. n-butyronitrile.

This invention may be variously otherwise embodied within the scope of the appended claim.

What is claimed is:

An electrolytic capacitor electrolyte consisting of a solute selected from the group consisting of (a) the 1:1 adduct of aniline and maleic anhydride and (b) the 1:1 adduct of heptafluorobutyric acid and triethanolamine, said solute being the adduct combination of a strong electron affinity compound and a nucleophilic substance, said solute being dissolved in a solvent selected from the class consisting of triethylene glycol, dimethyl formamide, propionitrile, glycolo nitrile, lacto nitrile and n-butyronitrile, said solute being from about 1 to 50% of the solvent.

References Cited in the file of this patent

UNITED STATES PATENTS

| 1,959,130 | Hambuecken et al. | May 15, 1934 |
| 2,084,046 | Owen | June 15, 1937 |
| 2,153,999 | Waterman | Apr. 11, 1939 |
| 2,162,397 | Gray | June 13, 1939 |
| 2,168,156 | Clark | Aug. 1, 1939 |
| 2,227,146 | Linden | Dec. 31, 1940 |
| 2,680,717 | Little | June 8, 1954 |
| 2,759,132 | Ross | Aug. 14, 1956 |